United States Patent [19]

Magelky

[11] Patent Number: 4,520,877

[45] Date of Patent: Jun. 4, 1985

[54] ROW CULTIVATOR WITH STRUCTURE TO INHIBIT BOWING OF ITS FRAME END TO END

[76] Inventor: Bruce F. Magelky, Box 26, New Hradec, N. Dak. 58648

[21] Appl. No.: 470,298

[22] Filed: Feb. 28, 1983

[51] Int. Cl.³ .................... A01B 39/02; A01B 39/18
[52] U.S. Cl. ................... 172/643; 172/421; 172/451; 172/656; 172/688
[58] Field of Search ............ 172/310, 421, 451, 656, 172/741, 643, 687, 688, 689, 776

[56] References Cited

U.S. PATENT DOCUMENTS

| | | | |
|---|---|---|---|
| 2,862,341 | 12/1958 | Miller | 172/780 |
| 3,081,567 | 3/1963 | Saul | 172/780 X |
| 3,135,339 | 6/1964 | Fry et al. | 172/688 X |
| 3,312,290 | 4/1967 | Abbott | 172/451 |
| 3,403,737 | 10/1968 | Byrd | 172/421 |
| 3,698,489 | 10/1972 | Norrell et al. | 172/656 |
| 4,350,211 | 9/1982 | Coufal | 172/741 X |
| 4,406,329 | 9/1983 | Schlueter | 172/310 |

FOREIGN PATENT DOCUMENTS

| | | | |
|---|---|---|---|
| 803088 | 10/1958 | United Kingdom | 172/776 |
| 1120731 | 7/1968 | United Kingdom | 172/451 |
| 1249575 | 10/1971 | United Kingdom | 172/687 |

Primary Examiner—Richard T. Stouffer
Attorney, Agent, or Firm—Robert L. Harrington

[57] ABSTRACT

A cultivator designed to dig up weeds from between rows of crop. The structure of the cultivator is unified with a laterally extended front bar that carries digging tines that dig up weeds along each side of the row of crop of a number of rows at one time. A rear bar is spaced from and in parallel relationship with the front bar and carries digging tines that dig up weeds down the center of the rows. The structure is mounted to a tractor, and depth controlling wheels, supported on the ground during operation, determine in part the depth of penetration of the tines into the ground.

4 Claims, 5 Drawing Figures

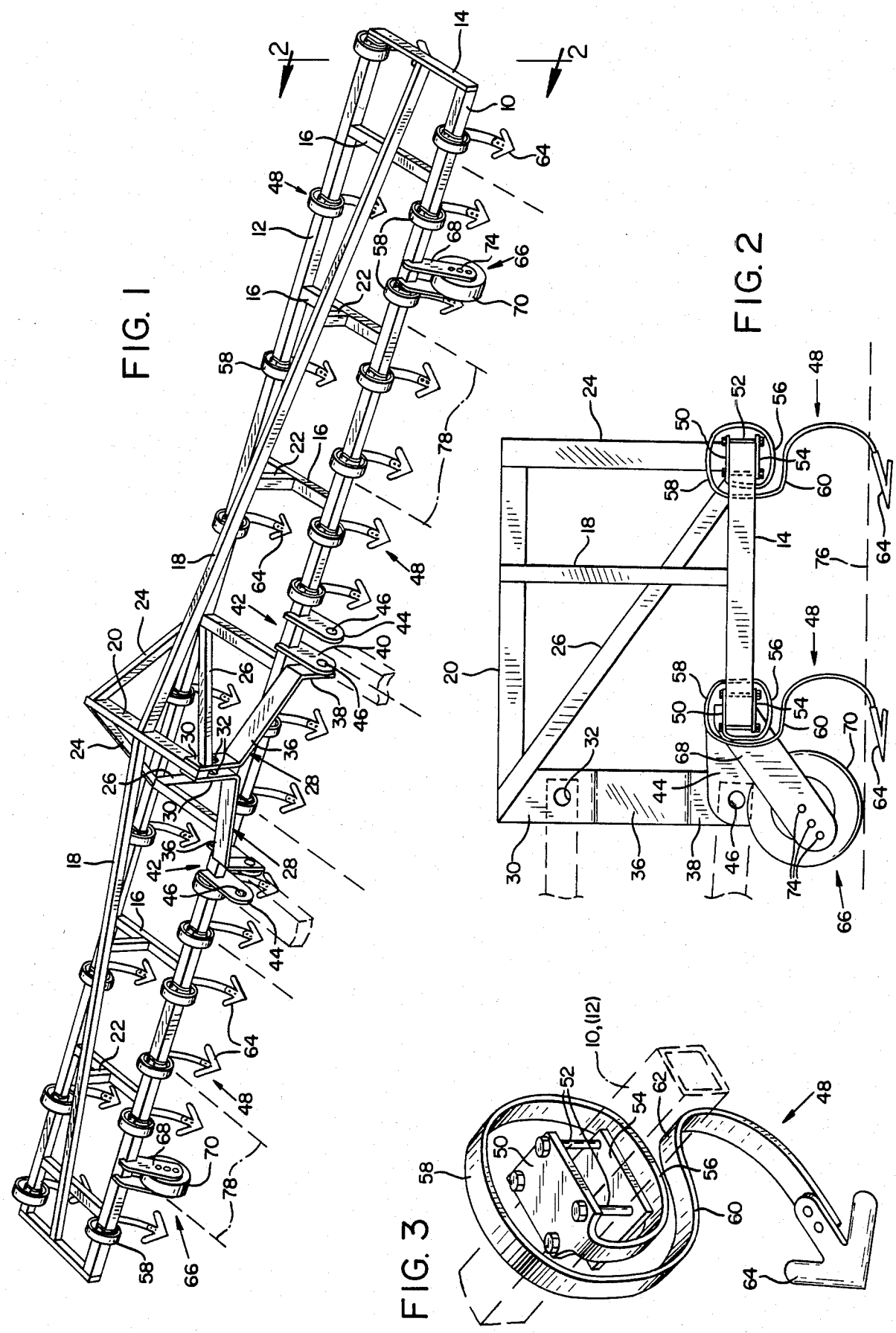

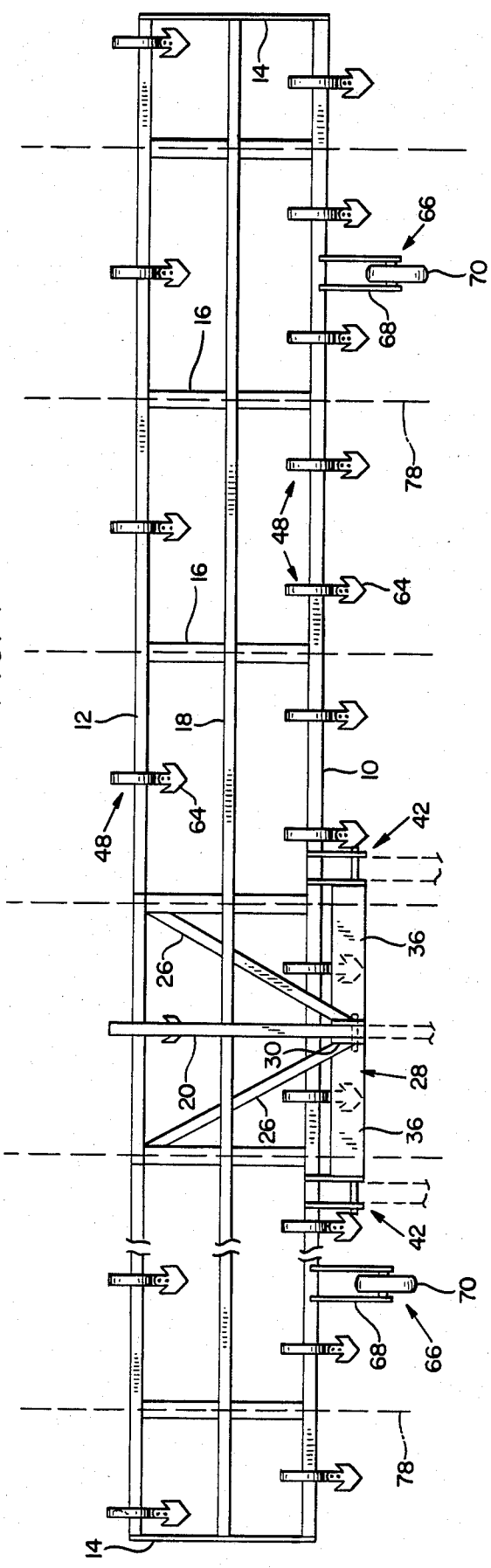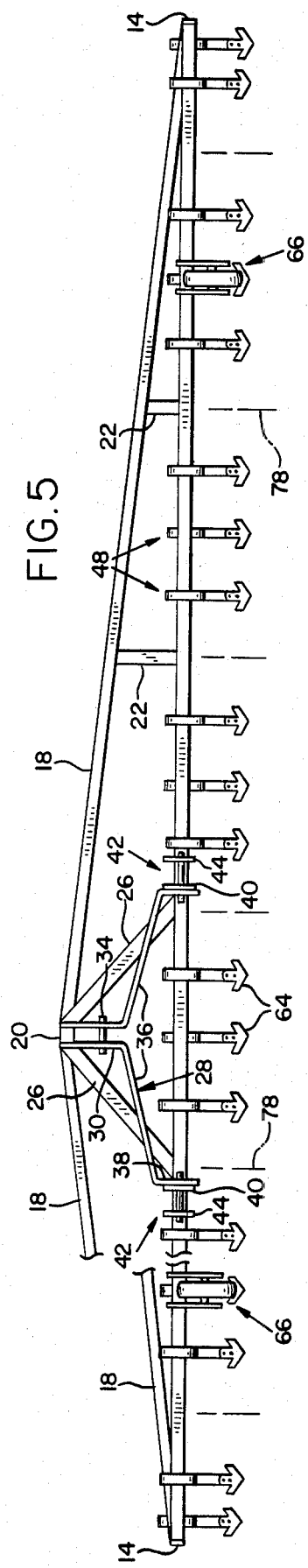

ROW CULTIVATOR WITH STRUCTURE TO INHIBIT BOWING OF ITS FRAME END TO END

A row cultivator for digging up unwanted plant growth between crop rows e.g., corn, sunflowers, and soy beans.

BACKGROUND OF THE INVENTION

Row crops such as corn are very carefully planted in precise rows that are spaced apart a specific distance. This enables the utilization of a multi-row cultivator. Such a cultivator has digging teeth that dig through the soil between the rows to remove nutrient robbing weeds. It will be understood that such a cultivator must be carefully controlled. If the cultivator is allowed to stray from side to side it will dig up and destroy the crop. Thus the usual cultivator is designed to be mounted for direct control by the tractor rather than through a single point hitch arrangement as is typical for other farm implements.

Whereas the cultivator teeth need to be confined against side to side movement, it will be understood that, as the cultivator passes over swells and valleys in the ground, the teeth also need to extend and withdraw to maintain an appropriate depth of penetration. Also, in the event that a tooth engages a large rock, some provision needs to be made to allow that tooth to retract.

Heretofore, the above needs have been satisfied in prior row cultivators by a complicated arrangement of components. A mounting bar is fixed to the tractor and independent teethcarrying sections are fixed along the bar. The sections are mounted in such a way that during the cultivating process, pivitol movement is allowed around an axis perpendicular to the direction of the rows, but side movement is prevented. As the cultivator travels over the different swells and valleys, the independent sections float up and down accordingly.

The prior row cultivators referred to above have several disadvantages. The independent sections are generally too light in weight to maintain the necessary downward pressure to keep the teeth buried the desired depth in the ground. Thus some kind of loading means is desired. Commonly the operator will simply fix weights, for example rocks, onto the sections to achieve the desired loading. Also, with the numerous sections all having independent pivoting means, there is undesirable care and maintenence required. Still further, the total weight creates added burden and consequently added cost for tractor maintenence. Finally and by no means less important, the complex mechanism of the multiple components makes the row cultivator of the prior device expensive to produce and thus expensive to purchase.

BRIEF DESCRIPTION OF THE INVENTION

The present invention greatly simplifys the prior row cultivators by the provision of a design that eliminates the need for independent sections. In brief, the preferred embodiment of the invention comprises a pair of mounting bars (a front bar and a back bar) rigidly fixed to each other and spaced in parallel relationship. The parallel bars are provided with substantial structural support to maintain the rigid integrity of the bars and also are provided with means for mounting the apparatus directly to a tractor. Digging teeth are fixed to the shanks of coil-spring-configured tines. The tines are bolted to the bars in such a manner that the coil-spring configuration permits the teeth to be shoved backward and upward when engaged by an immovable object, e.g., a rock. The spring bias of the tines are sufficient to hold the teeth in the ground but permit some degree of float to accomodate swells and valleys in the ground. Downward pressure is maintained without additional loading, as the entire structure is rigidly tied together and the entire mass is relatively, uniformly applied to all of the teeth. The depth of penetration of the teeth is partially controlled by wheels mounted to the structure. The wheels travel on the ground during operation and maintain the parallel bars the desired distance above the ground and the digging teeth the desired distance below the ground.

DETAILED DESCRIPTION INCLUDING DRAWINGS

The above described preferred embodiment is simple in construction and thus far less costly to produce. Other advantages and improvements will become apparent by reference to the following detailed description and drawings wherein:

FIG. 1 is a perspective view of the preferred embodiment of the invention;

FIG. 2 is an end view as seen from 2—2 of FIG. 1;

FIG. 3 is a perspective view of the tine showing the manner in which it is mounted to the apparatus of FIG. 1;

FIG. 4 is a top view of the apparatus of FIG. 1; and

FIG. 5 is a front view of the apparatus.

Referring to the figures, a front square tubular bar 10 is fixed in spaced parallel relationship to a rear square tubular bar 12 through the rigid mounting of end cross braces 14 and intermediate cross braces 16. Bowing of the structure end to end is undesirable and it will be understood that the present structure is designed to cultivate eight rows of crop at once. Each row is located 30 inches apart and the overall length of the structure is 20 Ft. long. Such bowing is prevented by overhead beams 18 which extend from the end braces 14 and are anchored to an elevated central support provided by overhead beam 20. Vertical struts 22 between the intermediate cross braces 16 and overhead beams 18 further strengthen and rigidify the structure.

The central overhead beam 20 is further fixed to the structure by braces 24 connecting the rear of the center beam 20 to the rear bar 12, and by braces 26 connecting the front of the central beam 20 to the rear bar 12. A pair of S shaped rigid, metal straps 28 provide the three point mounting hitch for mounting the apparatus to the tractor. One end of each strap is mounted to the front of central overhead beam 20 with the first leg 30 of each strap 28 depending downwardly and spaced in parallel relationship. A first mounting hole 32 in each strap accomodates a mounting pin 34 (see FIG. 5). A second leg 36 of each strap 28 is angled away from the first leg 30 and away from the other second leg 36. A third leg 38 of each S shaped strap 28 depends from the second leg and is fixed in a position forward of the front bar 10 by one leg 40 of a bracket 42 which is welded to the third leg 38 and the front bar 10. A second leg 44 of bracket 42 is spaced from the first leg 40 and mounting holes 46 through the bracket legs and the third leg of strap 28 accomodate mounting pins that provide the second and third points of the three point hitch.

Referring now to FIGS. 2 and 3, a coil-spring configured tine 48 includes a base portion 50 that is adapted to be bolted to front and rear tubular bars 10 and 12 by bolts 52. The bolts extend through the base portion, straddle the bar, and are affixed to a bottom base plate 54. The tine is coiled under (portion 56), over (portion 58), and back under (portion 60) the tubular bar as shown, and then reverse coiled (portion 62) to terminate in a forwardly projected direction relative to the apparatus. A digging tooth 64 is affixed to the end. It should particularily be noted that whereas the bolts are normally tightly secured to fix the tine against lateral movement on the bar 10 (or 12), adjustment is easily accomplished by loosening the bolts and sliding the tine one direction or the other. The bolts are of course then retightened.

Reference is now particularily made to FIGS. 1 and 2 which most clearly illustrate the depth controlling wheel structure 66. A pair of wheel struts 68 are welded at specific locations to the front square tubular bar 10. These struts are spaced apart sufficiently to accomodate a wheel 70. As noted, the struts 66 are angularly projected forward of the front tubular bar to position the wheel 70 forward of the digging tines. The axle 72 of the wheel 70 is designed to be inserted into bearing openings 74 in the struts and several openings 74 are provided to enable adjustment of the wheel on the struts. As can best be seen in FIG. 2 this adjustment changes the penetrating depth of teeth 64 below the surface of the ground represented by dash line 76.

OPERATION

The row cultivator illustrated above is designed to cultivate, at one time, eight rows of crop, e.g. corn, soy beans, sunflowers and the like. These rows of crop are illustrated by dashed lines 78 in FIG. 1. The objective of the apparatus is to dig out as much of the weed growth between the rows as can be accomplished without damaging the crop. The digging tines are positioned on the tubular bar 10 to provide one digging tine as close as practical on each side of a row 78. The digging tines on tubular bar 12 are positioned to dig up weeds from down the center between the rows as best seen in FIG. 4. The wheels 66 are adapted to travel down the center between two rows and in alignment with a digging tine on the rear tubular bar.

It will be understood that as each tooth digs through the ground it leaves a furrow. In the case of the front digging teeth, these furrows are covered by the dirt thrown from the center back tooth which follows. A center furrows or trench is left which the wheel follows on the next cultivating operation (it being understood that this weeding operation is repetitive).

To provide an idea of the size of the apparatus, typically the rows of crop are sown 30 inches apart. Thus the 8 row cultivator shown is made almost entirely of steel and can be expected to reach 240 inches or 20 feet in length. The wheels are spaced 180 inches or 15 feet apart. The tubular bars 10 and 12 have one quarter inch thick walls and a cross sectional demension of 2 inches by 2 inches. The straps 28 are 4 inches wide and $\frac{3}{8}$ inches thick and the vertical distance between the mounting holes is $11\frac{1}{2}$ inches with the brackets 42 spaced 36 inches apart. The end braces are 4 inches wide by $\frac{1}{4}$ inch thick and the distance that bar 10 and 12 are spaced apart is 16 inches. The overhead beams 18 as well as other support members are $\frac{1}{8}$ inch thick with a cross section measuring $1\frac{1}{2}$ inches by $1\frac{1}{2}$ inches.

It will of course be understood that the measurements given above are simply for purposes of explanation and are not intended to limit the scope of the invention. Others having exposure to the concept of this invention will undoubtedly conceive of modifications and variations. As determined by the claims appended hereto, such modifications and variations are encompassed by this invention.

I claim:

1. A multi-row crop cultivator adapted to move along rows of crop for digging up weeds from between the rows comprising; generally rigid bars and cross braces rigidly interconnected to form an elongated unified frame extending lengthwise laterally of the direction of movement and adapted to be carried in a suspended relationship over the ground, weed digging and cultivating teeth, spring biased mounting means mounting the teeth below the frame at spaced intervals along the elongated unified frame for shallow digging of weeds and limited retraction upon engaging solid objects, said teeth arranged on the frame to provide open spacings thru which multiple rows of crop are adapted to be passed as the weeds between the rows are dug up by the teeth, depth limiting wheels mounted on the frame to establish the height at which the frame is carried over the ground and along the rows in a cultivating operation, said frame being sufficiently extensive to incur end to end bowing of the generally rigidly interconnected rigid bars and cross braces, structural means for inhibiting such bowing of the frame end to end so as to maintain a consistant height of the frame above the ground and to generally apply the weight of the frame evenly to all of the teeth, said structural means including an elevated central support member and vertically extended support braces between the frame and the elevated central support member, said support braces rigidly supporting the central support member spaced upwardly from the rigid bars and cross braces, and a rigid overhead beam independent of said support braces for the central support members extending substantially the entire distance from each end of the frame to the elevated central support member, each said overhead beam being anchored on said central support member and oriented substantially perpendicular to the direction of movement, each said overhead beam further extending diagonally upwardly from the frame to the central support member to establish with the central support member a triangular support configuration on each side of the frame.

2. A multi-row crop cultivator as defined in claim 1 wherein the rigid bars and cross braces of the frame are comprised of front and rear horizontally spaced bars and cross braces between the bars across the ends thereof and at spaced intervals intermediate the ends to affix the bars in a generally parallel relationship, and said vertically extended support braces extending between both the front and rear bars to the central support member, and said rigid over head beams extending to the end cross braces of the frame.

3. A multi-row cultivator as defined in claim 2 including vertical struts between the overhead beams and the intermediate cross braces to further rigidify the frame and prevent bowing thereof.

4. A multi-row cultivator as defined in any one of claims 1, 2, or 3 wherein the mounting means for each of said teeth is coil spring configured and retracts toward the frame in reaction to engagement by that one of said teeth to increased digging resistance so as to provide independant vertical floating for each of said teeth.

* * * * *